United States Patent
Hagiwara et al.

(10) Patent No.: US 7,420,012 B2
(45) Date of Patent: Sep. 2, 2008

(54) RUBBER COMPOSITION

(75) Inventors: Isao Hagiwara, Yokohama (JP);
Naruhiko Mashita, Yokohama (JP);
Hiroki Nakano, Yokohama (JP);
Katsuhiko Tsunoda, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 94 days.

(21) Appl. No.: 10/558,676

(22) PCT Filed: Jun. 16, 2004

(86) PCT No.: PCT/JP2004/008764

§ 371 (c)(1),
(2), (4) Date: Nov. 30, 2005

(87) PCT Pub. No.: WO2004/113434

PCT Pub. Date: Dec. 29, 2004

(65) Prior Publication Data

US 2007/0112116 A1    May 17, 2007

(30) Foreign Application Priority Data

Jun. 18, 2003  (JP) .............................. 2003-173057
Aug. 5, 2003   (JP) .............................. 2003-286806

(51) Int. Cl.
*C08F 36/02*    (2006.01)
*C08K 3/34*     (2006.01)

(52) U.S. Cl. ................ 524/442; 524/445; 526/335; 526/346; 526/348.6

(58) Field of Classification Search ............... 526/335, 526/346, 348.6; 524/445, 442
See application file for complete search history.

(56) References Cited

U.S. PATENT DOCUMENTS

| 5,576,373 | A | * | 11/1996 | Kresge et al. | ............... 524/445 |
| 5,936,023 | A | * | 8/1999  | Kato et al.   | ............... 524/445 |
| 6,034,164 | A | * | 3/2000  | Elspass et al.| ............... 524/445 |

FOREIGN PATENT DOCUMENTS

| JP | 09-316238   | * | 12/1997 |
| WO | 0034378 A1  |   | 6/2000  |
| WO | WO 00/34378 | * | 6/2000  |

OTHER PUBLICATIONS

Vu et al, Journal of Applied Polymer science, vol. 82, 1391-1403(2001).*

* cited by examiner

*Primary Examiner*—Ling-Siu Choi
(74) *Attorney, Agent, or Firm*—Sughrue Mion, PLLC

(57) ABSTRACT

The rubber composition and the material suitable for preparing the rubber composition show high gas-barrier properties and being free from inhibition of vulcanization. The rubber composition is essentially composed of a rubber and a layered mineral filler treated with short chain alkyl ammonium salt.

9 Claims, No Drawings

RUBBER COMPOSITION

BACKGROUND OF INVENTION

1. Field of the Invention

The present invention relates to a rubber composition which is useful for preparing products such as a rubber hose, a gasket and packing material, and to material for the rubber composition.

2. Description of the Related Art

It have been known to add a layered mineral filler such as clay or mica in the form of flat to a rubber to mix them in order to improve gas-barrier properties of the rubber. The layered mineral filler in the form of flat is not permeable to gas, and therefore it is generally considered that the gas-barrier properties of the rubber composition can be improved by the volume fraction of the filler mixed with the rubber.

Even the use of the layered mineral filler is restricted in the improvement of the gas-barrier properties. In contrast, increase of the added amount of the layered mineral filler brings about deterioration of processing properties (e.g., extruding properties) of a formulation for the rubber composition and increase of the weight of the formulation, and further leads to lowering of strength and elongation of the resultant rubber composition.

JP-A-11-159667 describes a process for preparing a rubber composition by using an organic-treated clay and a modified butyl rubber having a carboxylic anhydride group. Further it describes that a hose for transporting refrigerant is obtained by use of the rubber composition and the hose has excellent vibration absorbing properties and fluid-barrier hose has excellent vibration absorbing properties and fluid-barrier properties. The organic-treated clay (clay treated with organic compound) is obtained by ionicically combining a clay with an organic onium ion. Examples of the organic onium ion include ammonium ion having six or more carbon atoms such as hexyl ammonium ion, stearyl ammonium ion and trioctyl ammonium ion.

SUMMARY OF THE INVENTION

The inventors have eagerly studied to obtain a rubber composition having high gas-barrier properties (i.e., low gas permeability) using layered mineral fillers. The present applicant has already developed technology for accomplishing the condition in which layers constituting the layered mineral filler are exfoliated one another and each of the layers is highly dispersed in a rubber. In more detail, by highly dispersing the layered mineral filler in a rubber, a rubber composition having high gas-barrier properties can be obtained even using a small amount of filler. For example, Japanese Patent Application No. 2002-169950, which has been filed by the present applicant, describes that a rubber composition having high gas-barrier properties can be prepared by using a mica treated with di-methylalkylammonium salt having a long chain alkyl group.

According to further study of the inventors, in case the gas-barrier properties of the rubber composition is intended to be further enhanced, even the rubber composition obtained by using the mica treated with di-methylalkylammonium is apt to suffer from adverse effect such as insufficient vulcanization and thus lowering of compression set due to the treatment with the dimethylalkylammonium though it has high gas-barrier prop-properties.

In view of the above-mentioned problems, the object of the present invention is to provide a rubber composition having high gas-barrier properties and being free from inhibition to vulcanization.

Further, the object of the present invention is to provide a rubber composition which has high gas-barrier properties and excellent mechanical characteristics brought about by vulcanization free from inhibition (without inhibition), and which can be prepared by a simple device.

Furthermore, the object of the present invention is to provide material suitable for preparing the above rubber composition.

The invention is provided by a rubber composition comprising a rubber and a layered mineral filler treated with alkylated ammonium salt having the following formula (1):

$$(R^1\text{—})(R^2\text{—})(R^3\text{—})(R^4\text{—})N^+ \cdot X^- \qquad (1)$$

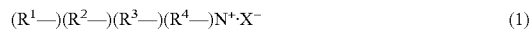

in which $R^1$, $R^2$, $R^3$ and $R^4$ each present a hydrocarbon group, at least three groups of the $R^1$, $R^2$, $R^3$ and $R^4$ having carbon atoms of 1 to 5, and $X^-$ represents an anion.

In the rubber composition, layers constituting the layered mineral filler are generally arranged such that the surfaces of the layers are parallel to one another. The filler is preferably dispersed in the rubber. Further, the alkylated ammonium salt is preferably present between layers of the layered mineral filler.

In the formula (1), $R^1$, $R^2$, $R^3$ and $R^4$ generally present a hydrocarbon group having carbon atoms of 1 to 5, and preferably the hydrocarbon group has carbon atoms of 2 to 4 in view of vulcanization. It is also preferred that $R^1$, $R^2$, $R^3$ and $R^4$ preferably have the same carbon atoms as one another.

The alkylated ammonium salt is preferably alkylated ammonium halide (especially chloride, bromide).

The layered mineral filler is generally at least one selected from the group consisting of mica, talc and clay. Two or more kinds of these fillers can be combined.

The rubber is generally at least one selected from the group consisting of butyl rubber, halogenated butyl rubber, acrylonitrile-butadiene rubber and a blend of acrylonitrile-butadiene rubber and polyvinyl chloride. Two or more kinds of these rubbers can be combined. Especially preferred is the halogenated butyl rubber, which is generally halogenated product of copolymer mainly consisting of isobutylene. The halogenated product of copolymer mainly consisting of isobutylene is preferably brominated isobutylene-4-methylstyrene copolymer or brominated isobutylene-isoprene copolymer.

The layered mineral filler treated with alkylated ammonium salt is generally contained in the amount of 0.1 to 200 weight %, preferably 0.5 to 150 weight %, especially 1 to 130 weight % based on the rubber.

Further, the present invention is provided by a rubber composition prepared by vulcanization (cure) of the above-mentioned rubber composition.

Furthermore, the present invention is provided by a layered mineral filler treated with alkylated ammonium salt having the above-mentioned formula (1).

In the layered mineral filler, the alkylated ammonium salt is preferably present between layers constituting the layered mineral filler. In the formula (1), $R^1$, $R^2$, $R^3$ and $R^4$ generally present a hydrocarbon group having carbon atoms of 1 to 5, and preferably 2 to 4 in view of vulcanization. It is also preferred that $R^1$, $R^2$, $R^3$ and $R^4$ preferably have the same carbon atoms as one another.

The alkylated ammonium salt is preferably alkylated ammonium halide (especially chloride, bromide).

The layered mineral filler is generally at least one selected from the group consisting of mica, talc and clay. The combination of two or more kinds of these fillers can be employed.

DETAILED DESCRIPTION OF THE PREFERRED EMBODIMENT

The rubber composition of the present invention has a basic structure in which a layered mineral filler is highly dispersed in a rubber by means of a definite alkylated ammonium salt. By using the definite alkylated ammonium salt of the invention, the rubber composition has extremely highly gas-barrier properties and free from lowering of compression set and thus shows flexibility suitable for the rubber composition. It is considered that the reason is because the layered mineral filler is highly dispersed in the rubber composition containing the definite alkylated ammonium salt and in addition the composition can be vulcanized (cured) without receiving inhibition to the vulcanization.

The rubber composition of the invention is generally prepared by mixing starting materials comprising the layered mineral filler, the definite alkylated ammonium salt and a rubber, or starting materials comprising the layered mineral filler treated with the definite alkylated ammonium salt and a rubber by means of a conventional kneader such as internal mixers (e.g., Bunbary mixer). When a crosslinking agent (vulcanizer) is further added to the materials, a cured (vulcanized) rubber composition can be obtained.

The invention has a feature that the definite alkylated ammonium salt represented by the following formula (1):

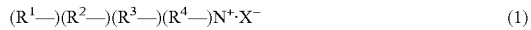

$$(R^1—)(R^2—)(R^3—)(R^4—)N^+ \cdot X^- \qquad (1)$$

in which $R^1$, $R^2$, $R^3$ and $R^4$ each present a hydrocarbon group, at least three groups of the $R^1$, $R^2$, $R^3$ and $R^4$ having carbon atoms of 1 to 5, and $X^-$ represents an anion is used to highly disperse the layered mineral filler into the rubber.

In the formula (1), $R^1$, $R^2$, $R^3$ and $R^4$ generally present a hydrocarbon group having carbon atoms of 1 to 5, and the hydrocarbon group preferably has carbon atoms of 2 to 4 in view of vulcanization. It is also preferred that $R^1$, $R^2$, $R^3$ and $R^4$ preferably have the same carbon atoms as one another.

The alkylated ammonium salt is preferably alkylated ammonium halide (especially chloride, bromide).

The rubber composition of the invention uses the alkylated ammonium salt (1) having alkyl chain of 1 to 5 carbon atoms, and therefore scarcely suffers from adverse effect to vulcanization compared with a rubber composition using alkylated ammonium salt having alkyl chain of 6 or more carbon atoms, whereby it is possible to sufficiently vulcanize the rubber composition of the invention. Hence, the vulcanized rubber composition of the invention has high gas-barrier properties and simultaneously excellent mechanical properties such as less reduction of compression set. Thus the invention includes a rubber composition before vulcanization and a vulcanized rubber composition.

The layered mineral filler treated with the alkylated ammonium salt having the formula (1) is novel, and the filler is useful in the preparation of the rubber composition of the invention. The layered mineral filler and rubber composition according to the invention are explained below.

Examples of the layered mineral filler used in the invention include clay, kaolin clay, mica and talc. Preferred are clay, mica and talc because they have flat shape. The mean particle size of the layered mineral filler is generally not more than 20 μm, preferably 0.1 to 15 μm, especially 0.1 to 8 μm.

The clay generally is a fine particle mainly composed of one or more clay mineral and having the mean particle size of not more than 20 μm, preferably 0.1 to 15 μm, especially 0.1 to 8 μm. The clay mineral is a fine particle of layered silicate, and generally has a layered structure that the layers composed of tetrahedron, in which $Si^{4+}$ ions are disposed so as to have four coordinations to oxide ion ($O^{2-}$), and the layers composed of oc-tahedron, in which ions such as $Al^{3+}$, $Fe^{2+}$, $Fe^{3+}$ or $Mg^{2+}$ are disposed so as to have six coordinations to oxide ion ($O^{2-}$) and hydroxide ion ($OH^-$), are bonded to each other in a ratio of 1:1 or 2:1 and further the bonded layers are piled up. Examples of the clay mineral include kaolinite, hallosyte, montmorillonite, zeolite and vermiculite.

Mica is a triclinic layered silicate characterized by perfect basal cleavage, which is a complicated potassium aluminosilicate. The general composition formula of the mica is represented by $XY_{2-3}Zn_4O_{10}(OH, F)_2$ in which X represents Ba, Ca, $(H_3O)$, K, Na or $(NH_4)$, Y represents Al, $Cr^{3+}$, $Fe^{2+}$, $Fe^{3+}$, Li, Mg, $Mn^{2+}$ or $V^{3+}$, and Z represents Al, Be, Fe or Si. The mean particle size of the mica is generally not more than 20 μm, preferably 0.1 to 15 μm, especially 0.1 to 8 μm.

Talc is magnesium silicate, which is generally represented by $Mg_2Si_4O_{10}(OH)_2$.

The layered mineral filler is generally used in the amount of 0.1 to 200 weight %, preferably 0.5 to 150 weight %, especially 1 to 130 weight % based on the rubber.

Inorganic fillers in addition to the layered mineral filler can be employed. Examples of the inorganic fillers include kaolin, calcium carbonate and silica.

Examples of the rubber (rubber or rubber latex) used in the invention include natural rubber, styrene-butadiene rubber (SBR), butadiene rubber, isoprene rubber, chloroprene rubber, butyl rubber (IIR), halogenated butyl rubber, ethylene-propylene rubber, acrylic rubber, chlorosulfonated polyethylene rubber, acrylonitrile-butadiene rubber, a blend of acrylonitrile-butadiene rubber and polyvinyl chloride, fluoro rubber latex, silicone rubber latex and urethane rubber latex. Of these, acrylonitrile-butadiene rubber, a blend of acrylonitrile-butadiene rubber and polyvinyl chloride, butyl rubber (IIR) and halogenated butyl rubber are preferred. Particularly halogenated butyl rubber is preferred. These polymers can be used singly or in a mixture of two or more kinds.

The halogenated butyl rubber is a halogenated product of copolymer of isobutylene as main monomer and the other monomer. The other monomer generally is hydrocarbon having one or two carbon-carbon double bond (C═C). Examples of the hydrocarbon having one carbon-carbon double bond include ethylene, propene, butene, hexene, styrene and alkyl-styrene (e.g., 4-methylstyrene). Examples of the hydrocarbon having two carbon-carbon double bonds include isoprene and butadiene. The isobutylene is preferably contained in the copolymer in the range of 80 to 99% by mole, especially in the range of 90 to 99% by mole. It is in general to halogenate the other monomer unit. In the halogenation, chlorine or bromine is preferably employed. For example, in case isobutylene-isoprene copolymer is chlorinated, isobutylene-chloroisoprene copolymer is obtained. The halogen content of the halogenated rubber preferably is in the range of 0.5 to 1.5% by mole, especially in the range of 0.75 to 1.2% by mole.

Preferred examples of the chlorinated rubber used in the invention include chlorinated isobutylene-isoprene copolymer (referred to as chlorinated butyl rubber), or chlorinated isobutylene-4-methylstyrene copolymer. Especially preferred is chlorinated isobutylene-4-methylstyrene copolymer.

Preferred examples of the brominated rubber used in the invention include brominated isobutylene-isoprene copolymer (i.e., brominated butyl rubber), or brominated isobutylene-4-methylstyrene copolymer. Especially preferred is brominated isobutylene-4-methylstyrene copolymer.

In the rubber composition of the invention, the above-mentioned rubber may be combined with polymer such as conventional thermoplastic polymer.

As a vulcanizer for vulcanization (cure), various commercially available compounds (e.g., sulfur, organic peroxide) can be employed.

Examples of sulfur-type vulcanizer include sulfur generally used as rubber vulcanizer such as powdered sulfur, highly dispersing sulfur and insoluble sulfur; thiurams such as tetramethylthiuram disulfide, tetraethylthiuram disulfide, tetrabutylthiuram disulfide, tetramethylthiuram monosulfide and dipentamethylenethiuram tetrasulfide; dithiocarbamates such as piperidine pentamethylenedithiocarbamate, pipecoline pipecolyldithiocarbamate, zinc dimethyldithiocarbamate, zinc diethyldithiocarbamate, zinc dibutyldithiocarbamate, zinc N-ethyl-N-phenyldithiocarbamate, zinc N-pentamethylenedithiocarbamate, zinc dibenzyldithiocarbamate, sodium dimethyldithiocarbamate, sodium diethyldithiocarbamate, sodium dibutyldithiocarbamate, copper dimethyldithiocarbamate, iron(II) dimethyldithiocarbamate and tellurium diethyldithiocarbamate; xanthogenates such as zinc butylxanthogenate, zinc isopropylxanthogenate and sodium isopropylxanthogenate; sulfenic amides (sulfenamides) such as N-cyclohexyl-2-benzothiazole sulfenamide, N-t-butyl-2-benzothiazole sulfenamide, N-oxydiethylene-2-benzothiazole sulfenamide and N,N-diisopropyl-2-benzothiazole sulfenamide; thiazoles such as 2-mercaptobenzothiazole and dibenzothiazyldisulfide.

As a vulcanizing accelerator, thiurams such as TMTD (tetramethyldisulfide), and dithiocarbamates such as EZ (zinc diethyldithiocarbamate) can be employed.

The vulcanizer is preferably used in the amount of 0.5 to 4.0 weight %, especially 1.0 to 2.5 weight %, based on the amount of the rubber.

Examples of the organic peroxide include hydrogen peroxide solution, cumene hydroperoxide, di-t-butylperoxide, t-butylcumyl peroxide, dicumyl peroxide, 2,5-dimethyl-2,5-di(t-butylperoxy)hexane, 1,3-bis(t-butylperoxyisopropyl) benzene, n-butyl-4,4-bis(t-butylperoxy)valerate, 1,1-bis(t-butylperoxy)-3,3,5-trimethylcyclohexane, 2,2-bis(t-butylperoxy)butane, benzoyl peroxide, p-chlorobenzoyl peroxide, 2,4-dichlorobenzoyl peroxide, t-butylperoxybenzene and vinyltris(t-butylperoxy)silane. Preferred is dicumyl peroxide. The organic peroxide is generally used in the amount of 0.2 to 8.0 weight %, preferably 0.25 to 4.0 weight %, especially 0.3 to 2.0 weight %, based on the amount of the rubber.

Otherwise, as a vulcanizer for vulcanization (cure) of the brominated rubber, zinc oxide is generally used, and if necessary (e.g., in case the other rubber is used), various commercially available compounds (e.g., sulfur, organic peroxide) can be employed. Moreover, it is also preferred to combine the vulcanizer with higher fatty acid such as stearic acid.

In the above case, as a vulcanizing accelerator, thiurams such as TMTD (tetramethyldisulfide), and dithiocarbamates such as EZ (zinc diethyldithiocarbamate) can be employed.

Further, in combination with the above compounds, organic peroxides, quinone oxime, multifunctional acrylic monomers (e.g., trimethylolethane triacrylate (TMETA), trimethylolpropane triacrylate (TMPTA), dipentaerythritolether hexaacrylate (DPEHA), pentaerythritol tetraacrylate (PETA), dimethylolpropane diacrylate (DMPDA), stearyl acrylate (SA)), and triazine thiol can be employed.

The vulcanizer is preferably used in the amount of 0.1 to 4.0 weight %, especially 0.1 to 2.5 weight %, based on the amount of the rubber.

The organic peroxide is generally used in the amount of 0.1 to 1.0 weight %, preferably 0.1 to 0.8 weight %, especially 0.3 to 0.5 weight %, based on the amount of the rubber.

Subsequently, a process for the preparation of the rubber composition of the invention is explained.

The layered mineral filler (e.g., mica) treated with alkylated ammonium salt of the invention can be prepared according to a process similar to that described in Example of JP-A-9-87432. The rubber composition of the invention can be prepared by mixing the alkylated ammonium salt with materials such as rubber, or by mixing the layered mineral filler with the alkylated ammonium salt and thereafter mixing the resultant mixture with materials such as the rubber, and then carrying out the subsequent processing.

The treated or mixed layered mineral filler and the materials such as the rubber are placed in a conventional kneader such as Brabender type mixer. Otherwise, untreated layered mineral filler and alkylated ammonium salt as well as the materials such as a rubber can be also placed in the kneader. The kneader is preferably set to the temperature enabling the treated or mixed layered mineral filler to finely disperse in the rubber. The temperature is generally in the range of 50 to 160° C., preferably 50 to 120° C. The time period for kneading is also preferably set to the range enabling the treated or mixed layered mineral filler to finely disperse in the rubber, and generally in the range of 1 to 15 minutes. The kneading is carried out under the above-mentioned conditions, whereby the rubber composition is obtained. Appropriate vulcanizer and/or vulcanizer accelerator are added to the resultant rubber composition by roll and vulcanized under the appropriate conditions to prepare a vulcanized rubber composition. In case vulcanization is not done, the resultant rubber composition is directly shaped by a process such as injection molding.

The rubber composition of the invention is advantageously used for products such as a hose, a gasket and a packing material, which requires excellent gas-barrier properties.

Further, the layered mineral filler treated with alkylated ammonium salt of the invention can be advantageously used for preparing the rubber composition of the invention.

Furthermore, the layered mineral filler treated with alkylated ammonium salt of the invention has excellent gas-barrier properties and gas-absorbing properties as well. Though this mechanism is not clarified, the layered mineral filler treated with alkylated ammonium salt of the invention is advantageously used not only for preparing the rubber composition but also as gas-barrier material and gas-absorbing material.

EXAMPLE

The invention is illustrated in detail using the following Examples. Examples do not restrict the scope of the invention.

Materials used in Examples are as follows:

(A) Rubber

Exxpro 3433: brominated butyl rubber (brominated isobutylene-4-methylstyrene copolymer; bromine content: 0.75 molar %; trade name: Exxpro 3433; available from Exxon Chemical)

(B) Ammonium salt

TMAC: tetramethylammonium chloride (trade name: TMAC 100% crystalline powder; available from LION AKZO CO., LTD.)

TEAC: tetraethylammonium chloride (trade name: TEAC 100% crystalline powder; available from LION AKZO CO., LTD.)

TBAB: tetrabuylammonium bromide (trade name: TBAB 100% crystalline powder; available from LION AKZO CO., LTD.)

(C) Layered mineral filler

MAE: dialkyl($C_{14-18}$)dimethylammonium chloride treated mica (trade name: Somashif MAE; available from CO—OP CHEMICAL CO., LTD.; organic-treated rate; 120 meq/100 g)

TMAC mica: TMAC treated mica (organic-treated rate; 119 meq/100 g)

TEAC mica: TEAC treated mica (organic-treated rate; 104 meq/100 g)

TBAB mica: TBAB treated mica (organic-treated rate; 86 meq/100 g)

The organic-treated rate (meq/100 g) of a surface of the organic-treated layered mineral filler (e.g., organic-treated mica) means equivalent number of replaced inorganic cation based on the 100 g of mica given by replacing an inorganic cation present in a layered mineral filler (e.g., mica) with an organic cation (e.g., ammonium ion).

Mistron Vapor: talc (trade name: MISTRON VAPOR; available from NIPPON MISTRON CO., LTD.)

(D) Vulcanizer/Vulcanizing Accelerator

ZnO: zinc oxide (trade name: Ginrei SR; available from TOHO ZINC CO., LTD.)

Accelerator TT: tetramethylthiuram disulfide (trade name: Sanceler TT-G; available from SANSHIN CHEMICAL INDUSTRY CO., LTD.)

Example 1 to 3, and Comparison Example 1 and 2

Preparation of Rubber Composition

The layered mineral fillers treated with alkylated ammonium salt (organic-treated mica) were prepared using a filler and an ammonium salt (B) prior to the preparation of the rubber composition.

As shown in FIG. 1, a rubber (A) and a layered mineral filler (C) were mixed by stirring them by use of Brabender type mixer at 120° C. for five minutes, to prepare a homogeneous mixture. The amounts of the used organic-treated micas were adjusted such that the molar numbers ($3.2 \times 10^{-3}$ mole/100 g of polymer) of tetra ammonium ion contained in the micas were the same as one another.

The vulcanizer/vulcanizing accelerator (D) was added to the resultant mixture using a roll and then rolled by a roll for rolling rubber, whereby a rolled sheet of thickness of 12.5 mm was prepared. A disc having diameter of 30 mm was prepared by punching the rolled sheet. The disc was used as a test sample, and was subjected to vulcanization test according to JIS K 6300 2:2001. A Curast used in the test was set to 160° C.

<Evaluation of Vulcanization Characteristics>

The vulcanization characteristics were determined using vibration type vulcanization tester according to JIS K 6300 2:2001. $M_H$ and $M_L$ are the maximum and minimum torque in the vulcanization curve of determined torque, respectively. $M_E$ is calculated by ($M_H-M_L$). $t_c(10)$ is an induced time (starting point of vulcanization), and $t_c(90)$ is 90% vulcanization time (point of optimum vulcanization).

The characteristics of the resultant vulcanization curve are shown in Table 1.

TABLE 1

| | Co. Ex. 1 | Co. Ex. 2 | Ex. 1 | Ex. 2 | Ex. 3 |
|---|---|---|---|---|---|
| Exxpro 3433 | 100 | 100 | 100 | 100 | 100 |
| MAE | | 5 | | | |
| TMAC mica | | | 2.22 | | |
| TEAC mica | | | | 2.98 | |
| TBAB mica | | | | | 4.21 |
| Talc | 10 | 10 | 10 | 10 | 10 |
| ZnO | 5 | 5 | 5 | 5 | 5 |
| Accelerator TT | 1 | 1 | 1 | 1 | 1 |
| Vulcanization Characteristics | | | | | |
| $M_E$ N · m | 0.37 | 0.29 | 0.35 | 0.36 | 0.36 |
| $M_H$ N · m | 0.49 | 0.40 | 0.47 | 0.49 | 0.49 |
| $M_L$ N · m | 0.12 | 0.10 | 0.12 | 0.12 | 0.12 |
| $t_c(90)$ min. | 5.2 | 18.0 | 4.7 | 4.0 | 7.3 |
| $t_c(10)$ min. | 1.6 | 4.1 | 1.6 | 1.5 | 2.3 |

As shown in Table 1, in Comparison Example 2, $M_E$ and $M_H$ are reduced and vulcanization is apt to be insufficient. In contrast, the rubber compositions of Examples 1 to 3 show accomplishment of sufficient vulcanization, which corresponds to vulcanization in Comparison Example 1 (not containing conventional alkylated ammonium salt). The $t_c(10)$ and $t_c(90)$ of the rubber composition of Comparison Example 2 are about 2.5 times and about 3.5 times, respectively, lager than $t_c(10)$ and $t_c(90)$ in Comparison Example 1. Further the ($t_c(90)$-$t_c(10)$) of the rubber composition of Comparison Example 2 are about 3.9 times lager than that in Comparison Example 1. Hence, the rubber composition of Comparison Example 2 shows insufficient vulcanization. On the other hand, as mentioned above, the rubber compositions of Examples 1 to 3 show sufficient vulcanization corresponding to vulcanization in Comparison Example 1

The above results reveal that the rubber composition (Co. Ex. 2) containing the mica treated with conventional alkylated ammonium salt is apt to show insufficient vulcanization compared with the rubber composition containing no mica treated the salt (Co. Ex. 1). Thus it has been apparently shown that the rubber compositions of Examples 1 to 3 containing mica treated with short chain alkyl ammonium salt of the invention show accomplishment of sufficient vulcanization due to little adverse effect to vulcanization. These rubber compositions have excellent gas-barrier properties, which are almost the same as one another.

5. INDUSTRIAL APPLICABILITY

The rubber composition of the invention, in which the layered mineral filler is dispersed in the form of fine squama in the rubber, has excellent gas-barrier properties. Further, the rubber composition of the invention contains the layered mineral filler treated with the alkyl ammonium salt having an alkyl chain of the defined carbon atom number, and therefore shows accomplishment of sufficient vulcanization due to little adverse effect to vulcanization compared with that containing a layered mineral filler treated with conventional alkylated ammonium salt. Thus, the vulcanized rubber composition obtained by vulcanization of the above rubber composition of the invention has excellent compression set and good other mechanical properties compared with that containing a layered mineral filler treated with conventional alkylated ammonium salt. Hence, the rubber composition of the invention is useful for preparing a rubber hose, a gasket and packing matrrial, etc.

Further, the use of the layered mineral filler of the invention treated with the alkylated ammonium salt easily enables the preparation of the rubber composition of the invention. Furthermore the layered mineral filler of the invention treated with the alkylated ammonium salt can be used as gas-barrier material and gas absorbing material per se.

What is claimed is:

1. A rubber composition comprising a rubber and a layered mineral filler treated with alkylated ammonium salt having the following formula (1):

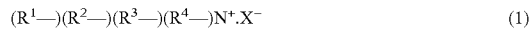

(1)

in which $R^1$, $R^2$, $R^3$ and $R^4$ each represent a hydrocarbon group, all of $R^1$, $R^2$, $R^3$ and $R^4$ having carbon atoms of 1 to 5 and having the same carbon atoms as one another, and $X^-$ represents an anion, wherein the alkylated ammonium salt is present between layers of the layered mineral filler.

2. A rubber composition as defined in claim 1, wherein the layered mineral filler is dispersed in the rubber.

3. A rubber composition as defined in claim 1, wherein the alkylated ammonium salt is alkylated ammonium halide.

4. A rubber composition as defined in claim 1, wherein the layered mineral filler is at least one selected from the group consisting of mica, talc and clay.

5. A rubber composition as defined in claim 1, wherein the rubber is at least one selected from the group consisting of butyl rubber, halogenated butyl rubber, acrylonitrile-butadiene rubber and a blend of acrylonitrile-butadiene rubber and polyvinyl chloride.

6. A rubber composition as defined in claim 5, wherein the halogenated butyl rubber is halogenated product of copolymer mainly consisting of isobutylene.

7. A rubber composition as defined in claim 6, wherein the halogenated product of copolymer mainly consisting of isobutylene is brominated isobutylene-4-methylstyrene copolymer.

8. A rubber composition as defined in claim 1, wherein the layered mineral filler treated with alkylated ammonium salt is contained in the amount of 0.5 to 150% by weight based on the rubber.

9. A rubber composition prepared by vulcanization of the rubber composition as defined in claim 1.

* * * * *